United States Patent
Collingwood et al.

(10) Patent No.: US 6,811,594 B1
(45) Date of Patent: Nov. 2, 2004

(54) FILTER MATERIALS AND METHODS FOR THE PRODUCTION THEREOF

(75) Inventors: Jeremy Andrew Collingwood, Hest Bank (GB); John Gordon, Stockport (GB)

(73) Assignee: Hollingsworth & Vose Air Filtration Limited, Cumbria (GB)

( * ) Notice: Subject to any disclaimer, the term of this patent is extended or adjusted under 35 U.S.C. 154(b) by 0 days.

(21) Appl. No.: 10/110,813
(22) PCT Filed: Oct. 16, 2000
(86) PCT No.: PCT/GB00/03975
§ 371 (c)(1), (2), (4) Date: Jul. 12, 2002
(87) PCT Pub. No.: WO01/28656
PCT Pub. Date: Apr. 26, 2001

(30) Foreign Application Priority Data

Oct. 19, 1999 (GB) .............................. 9924549

(51) Int. Cl.[7] .............................................. B03C 3/155
(52) U.S. Cl. ...................... 96/15; 55/528; 55/DIG. 5; 55/DIG. 39; 96/66; 96/69; 264/211.12; 264/DIG. 48
(58) Field of Search ................................ 96/15, 17, 66, 96/98, 55, 69; 55/527, 528, DIG. 5, DIG. 39; 264/211.17, 211.14, 211.12, DIG. 48; 95/57

(56) References Cited

U.S. PATENT DOCUMENTS

| | | | |
|---|---|---|---|
| 4,798,850 A | * | 1/1989 | Brown ........................ 521/134 |
| 5,013,502 A | * | 5/1991 | Reinehr et al. ............. 264/103 |
| 5,230,800 A | * | 7/1993 | Nelson ........................ 210/496 |
| 5,419,953 A | * | 5/1995 | Chapman ..................... 442/35 |
| 5,470,485 A | | 11/1995 | Morweiser et al. ......... 96/55 X |
| 5,620,785 A | * | 4/1997 | Watt et al. .................. 428/219 |
| 5,792,242 A | | 8/1998 | Haskett ........................ 96/68 |
| 5,898,981 A | * | 5/1999 | Legare ......................... 28/111 |
| 6,056,809 A | * | 5/2000 | Chapman ..................... 96/67 |

FOREIGN PATENT DOCUMENTS

| | | |
|---|---|---|
| EP | 0121299 | 10/1984 |
| EP | 0246811 | 11/1987 |
| GB | 002155423 | 5/1982 |
| JP | 57-78917 | * 5/1982 |
| WO | WO 98/17368 | * 4/1998 |

* cited by examiner

Primary Examiner—Richard L. Chiesa
(74) Attorney, Agent, or Firm—Bracewell & Patterson, L.L.P.

(57) ABSTRACT

There is disclosed an electrostatically charged filter material comprising a blend of polyester fibers and electrostatically chargeable fibers of at least one other kind.

2 Claims, 3 Drawing Sheets

FILTER MATERIALS AND METHODS FOR THE PRODUCTION THEREOF

This invention relates to filter materials for filtering fluids and methods for the production thereof, with particular, but by no means exclusive, reference to filters for air filtration.

Air filter materials having permanent electrostatic charge are known. Such materials filter particles very efficiently due to electrostatic attractive forces between the material and the particles to be filtered. Applications include air filtration in dust helmets, respirators, suction cleaners and air conditioning systems.

Filter materials desirably possess a number of advantageous properties. Such materials should filter particles efficiently whilst providing low resistance to the flow of fluid through the filter material. In the case of air filtration, this means a low air pressure drop across the filter material. Furthermore, it is important that the filtering performance of the filtering material is maintained, or, at least, that deterioration in performance is minimised, for as long a period of time as possible. In this way, the working lifetime of the filter is extended. Furtherstill, it is important that once the working lifetime of the filter is over, the filter can be disposed of safely. Recently, there has been a demand for filter materials which are resistant to attack by oily substances.

European Patent EP 0 246 811 describes air filter material which exhibit good filtration efficiency and low resistance to air flow due to the open structure of charged fibres employed. The material comprises a blend of polyolefine fibres and halogen substituted polyolefine fibres. U.S. Pat. No. 5,470,485 describes air filter material comprising a blend of bi-component polypropylene/polyethylene fibres of the core/jacket or side-by-side type and halogen free polyacrylonitrile fibres. The use of the bi-component fibres is an essential element of U.S. Pat. No. 5,470,485 so that stiff, mouldable non-woven mats of filter material can be produced. It should be noted that in each case the filter material is overall electrically neutral, fibres in the materials of different type carrying charges of opposed polarities.

The present invention provides high quality filter material which exhibits some or all of the advantageous properties described above.

According to a first aspect of the invention there is provided an electrostatically charged filter material comprising a blend of polyester fibres and electrostatically chargeable fibres of at least one other kind.

Such filter materials can exhibit excellent filtering efficiency, and shelf-lifetime, even if exposed to oil based liquid aerosols. Furthermore, polyester is readily available, and does not produce dioxins on incineration, in contrast in the halogen containing blends disclosed in EP 0 246 811.

Preferably, the filter material consists of a blend of polyester fibres and polyolefin fibres. In contrast to the filter material of EP 0 246 811, such material may be safely disposed of by incineration, since dioxin compounds are not produced. Preferably, the polyolefin fibres comprise polypropylene. The denier of the polypropylene fibres may exceed the denier of the polyester fibres. The denier of the polypropylene fibres may exceed the denier of the polyester fibres by a factor of at least 1.5.

The ratio by weight of the polyester fibres to the fibres of the other kind or kinds may be in the range 80:20 to 20:80; preferably 70:30 to 30:70; most preferably 60:40 to 40:60.

According to a second aspect of the invention there is provided a method for producing an electrostatically charged filter material comprising the step of blending together polyester fibres and electrostatically chargeable fibres of at least one other kind, and making a filter material from said blend.

The performance of the filter material is considerably affected by the present of lubricants and anti-static agents (collectively known as a "spin finish") on the surface of the fibres. In practise, polymer fibres produced commercially have spin finishes, and thus it is necessary to substantially remove lubricants and anti-static agents from the fibres before, during or after the blending of said fibres.

The method may comprise the steps of carding and/or air-laying, and cross-lapping the blend of fibres so as to form a non-woven fabric. The non-woven fabric may be suitable. Mechanically/thermally bonded, by methods such as calendering or needle-punching.

The polyester fibres may be blended with polyolefin fibres, which may be polypropylene fibres.

Filter materials and methods for the product thereof will now be described with reference to the accompanying drawings in which.

Figure 1:
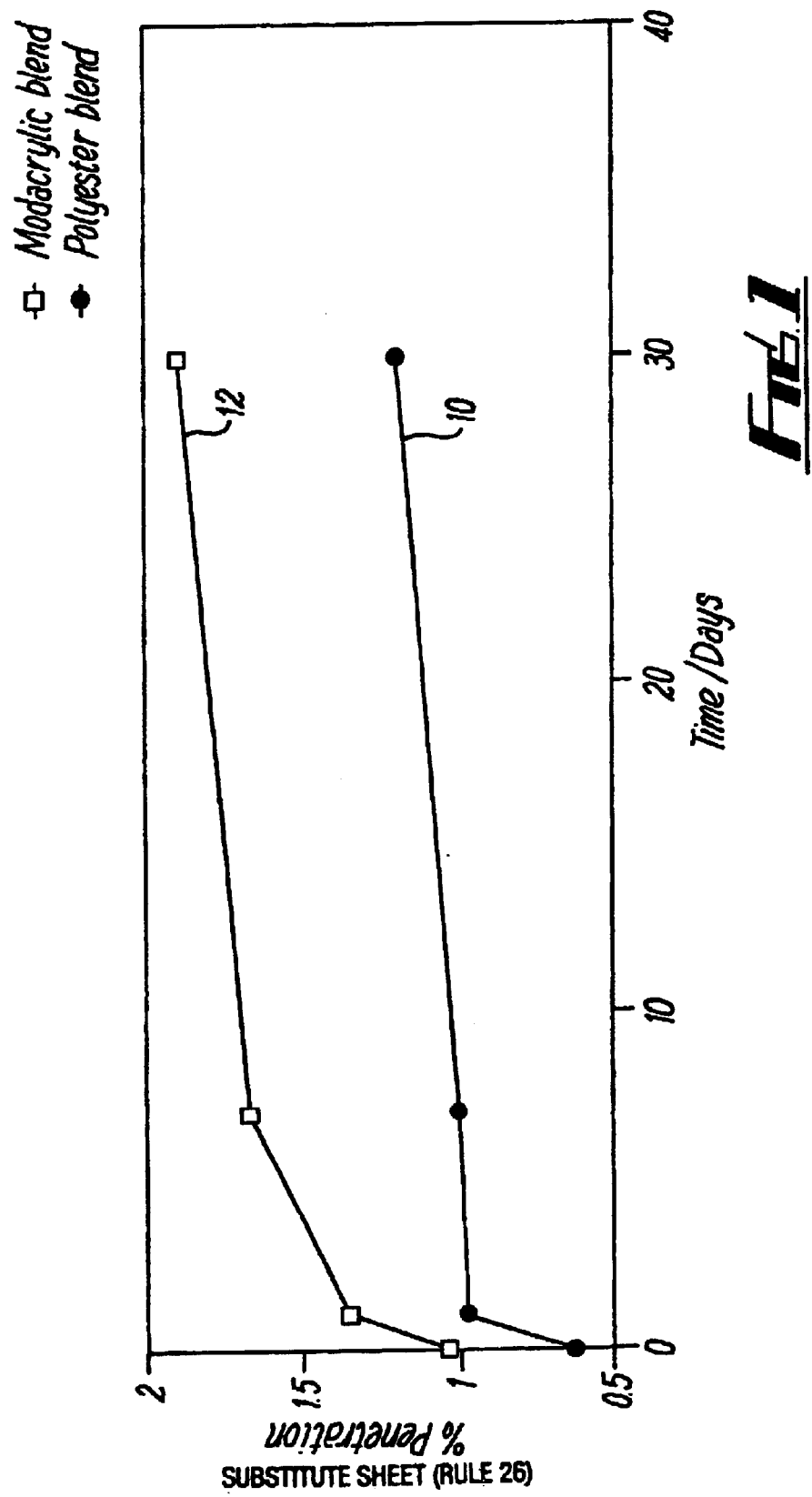
FIG. 1 shows filter performance over a period of time.

The invention comprises a filter material comprising a blend of polyester fibres and electrostatically chargeable fibres of at least one other kind.

The present invention recognises that the cleanliness of the fibres is of great importance if good filtering performance is to be obtained. In particular, there appears to be a relationship between the surface characteristics of the fibres used and long term performance of the filtering material. Fibres having surfaces that contain significant cracks and fissures generally produce inferior filtering material. It is likely that this is due, at least in part, to the difficulty of removing spin finish (and, possibly, water) from the cracks and fissures. Thus, it is preferable to utilise fibres having a smooth surface finish.

Filter material was produced generally according to the method described in EP 0 246 811. It should be noted that, in EP 0 246 811, removal of lubricants and anti-static agents is accomplished before blending of said fibres. The present examples, this removal step is performed after the step of blending the fibres. Both approaches are within the scope of the invention. The removal of lubricants and anti-static agents can be performed by a textile scouring process, such as detergent, alkali or solvent scouring. It is preferred to use a detergent scouring process, followed by rinsing and drying of the fibres.

The blended fibre can be carded and air-laid, a process which i) forms a non-woven fabric and ii) enables the fibres to acquire electrical charge. After carding and air laying, the product can be cross-lapped, then needled or calendered in order to produce a felt product. It is possible to solely card the blend, or to solely air-lay the blend, instead of both carding and air-laying. One advantage of the air-laying procedure is that, in addition to the orientation of the fibre in the longitudinal direction, a higher proportion of the fibre is oriented perpendicularly (i.e., down the length of the non-woven material). In use, this has the effect of increasing the contact between the air stream to be filtered and the fibre in the filter media, which results in higher filtering efficiency. Air-laying devices are commercially available.

Preferred embodiments of the present invention comprise blends of polyester and polypropylene. In one example, a 50/50 blend of polyester and polypropylene was used. For comparison purposes, a 50/50 blend of modacrylic and polypropylene was used to produce filter material according to EP 0 246 811.

The Table shows the % penetration of filter materials described above. The % penetration is the percentage of particles known in an air flow passing through the filter material which are not trapped by the filter material. The tests to determine the % penetration of the filter materials were performed according to the British Standard BS 4400 test. A 2 g mass of the the material in question, in standard capsule form, was tested using sodium chloride particles of 0.65 μm mean diameter.

| Blend | Penetration/% |
|---|---|
| polypropylene/modacrylic | 1.0 |
| polypropylene (2.5 denier)/ polyester (1.2 denier) | 0.65 |

Thus the embodiments of the present invention exhibit excellent filtering efficiencies. It was found that the embodiments in which the denier of the polypropylene is greater than the denier of the polyester, exhibit a superior shelf life. i.e. it retains its high filtering efficiency over a period of time.

FIG. 1 shows % penetration curves 10, 12 over an extended time period for, respectively, the polypropylene/polyester blend and the polypropylene/modacrylic blend (the preferred embodiment of EP 0 246 811). The % penetration represents the percentage of air particles passing through the filter material in an air flow (and therefore the efficiency value=100% minus the % penetration). Over a period of 30 days, the polypropylene/polyester blend performance drops to a penetration value of ca. 1.2%. In contrast, the polypropylene/modacrylic blend exhibits considerably higher penetration values, reaching ca. 1.9%. Furthermore, the performance of the polypropylene/polyester blend is superior to the polypropylene/modacrylic blend at all times during the test. The results shown in the Figure clearly imply that filters made from the polypropylene/polyester blend will have excellent working lifetimes. The working lifetime is given by the time period in which a filter can perform to within a specified standard.

Commercially produced filter materials made according to EP 0 246 811 utilise modacrylic as the halogen substituted polyacrylonitrile: indeed, modacrylic is the preferred fibre in EP 0 246 811. However, modacrylic suffers the disadvantage that, when incinerated, it produces highly toxic dioxins at unacceptably high concentrations. This is a considerable problem, because ISO 14000 standards, which cover a variety of environmental concerns, have been applied to the disposal of used air filtration materials. In some countries, notably in the Far East, legislation requires that such disposal is carried out by incineration. The polypropylene/polyester blend described herein does not produce dioxins when incinerated, since halogen substituents are not present in the fibres.

A further advantage associated with the polyester/polypropylene blends is the low moisture regain of the resulting filter material, which opens the door to HME (heat and moisture exchange) applications.

Experiments were performed to assess the affect of exposure to oil based liquid aerosols. Such aerosols are recognised as being generally more penetrating than solid particulates of equivalent size. Assessment of performance on exposure to oil based aerosols forms the basis of several International Standards for air filtration performance, such as NIOSH 42 CFR Part 84 and BSEN 143.

Figure 2:
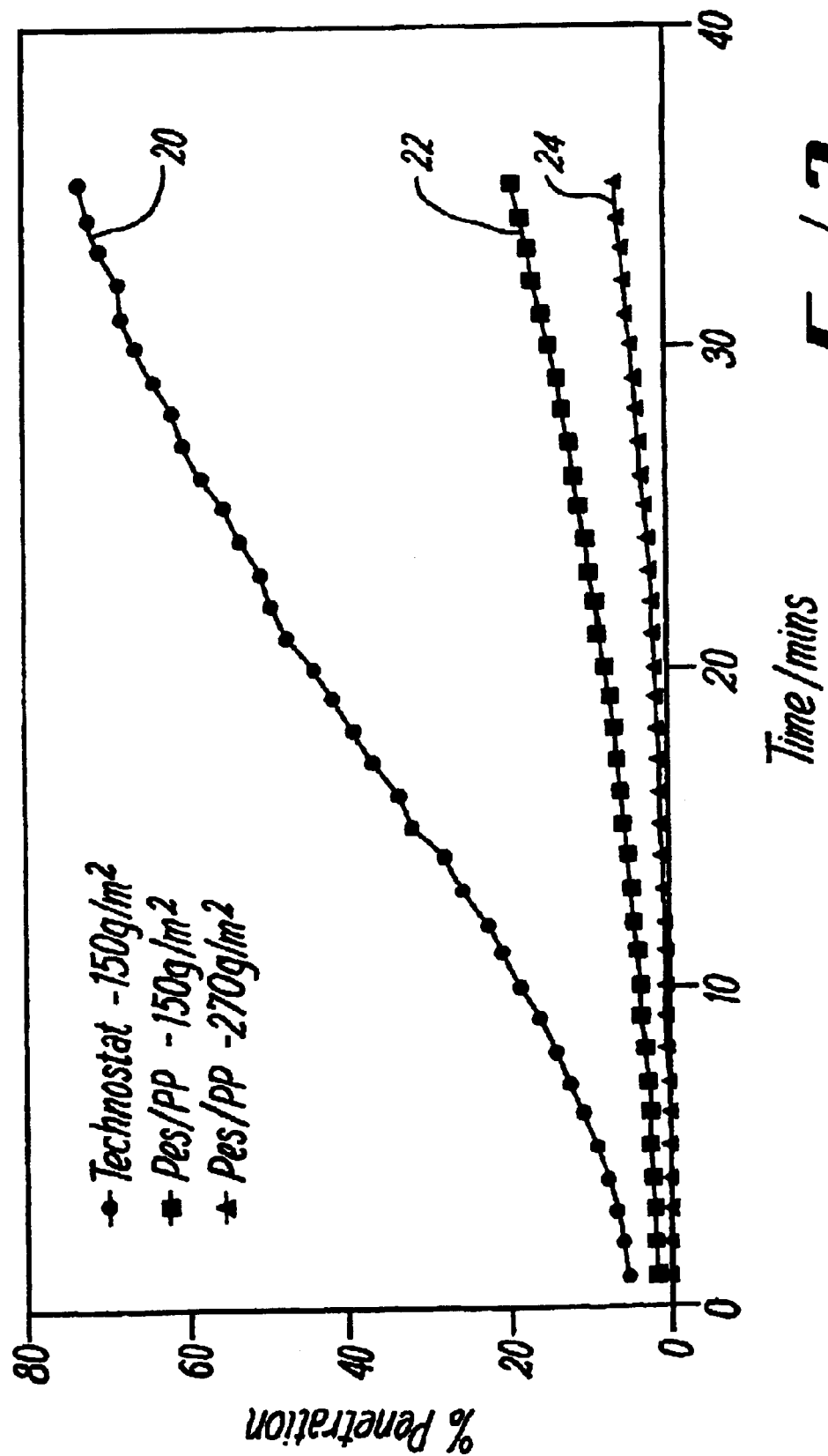
FIG. 2 shows filter performance on exposure to an oil based aerosol.

Three filter samples were tested by exposure to an 'oil-mist' aerosol of Di-iso-octyl-phthalate (DOP). The samples tested were a 50/50 blend of polypropylene/modacrylic (the preferred embodiment of EP 0 246 811) at a density of 150 gm$^{-2}$, a 50/50 blend of polypropylene/polyester at a density of 150gm$^{-2}$ and a 50/50 blend of polypropylene/polyester at a density of 270 gm$^{-2}$. Filter performance was investigated using a DOP aerosol at a flow rate of 42.5 lmin$^{-1}$. FIG. 2 shows the % penetration values 20, 22, 24 for the polypropylene/modacrylic blend, the 150gm$^{-2}$ polypropylene/polyester blend and the 270 gm$^{-2}$ polypropylene/polyester blend, respectively, over a period of 35 minutes. The performance of the blends of the present invention is clearly and substantially superior to the filter material produced according to EP0 246 811.

It has been found that a composite of the material of the present invention with a web of another fibrous material can lead to improvements in the initial efficiency and efficiency under load. The fibrous material can be microfibrous, and multiple layers can be provided. A composite can be produced using methods known in the art, such as by adhesive, needling or ultrasonic bonding. The attachment of an additional scrim may be used to improve the mouldability or rigidity of the composite, and may also afford additional protection.

Figure 3:
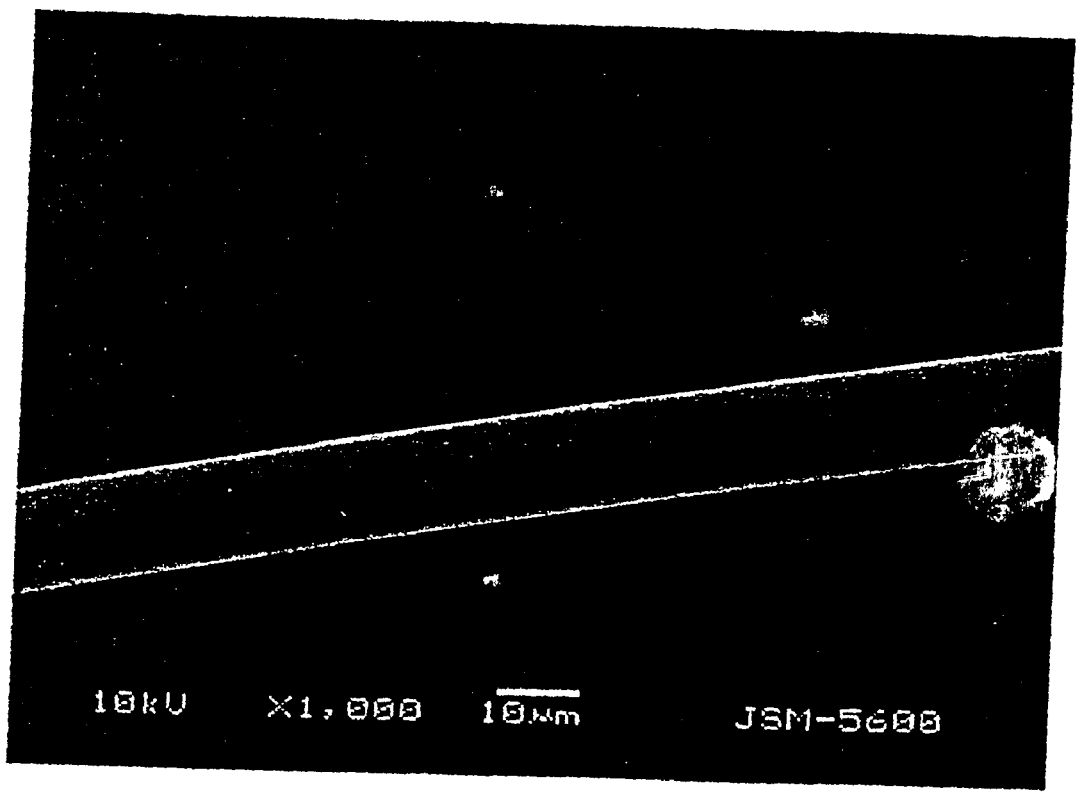
FIG. 3 is a scanning electron micrograph of a polyester fibre.

FIG. 3 shows a scanning electron micrograph of a polyester fibre. The fibre is very smooth, and is generally round in cross section. As a result, the electrostatically charged filter material of the invention which incorporates such polyester fibres have a very even distribution of charge and are less prone to the build up of moisture, and are easier to clear, resulting in entranced filtering efficiency.

It should be noted that blending ratios other than 50/50 are within the scope of the invention. Furthermore, polyester fibres can be blended with other fibres than polypropylene. For example, polyester fibres might be blended with acrylic fibres. Non-halogen containing acrylic fibres are preferred to modacrylic fibres, since the former do not produce dioxins when incinerated.

In the examples described above, fibres of "standard" diameters, i.e., ca. 1.0–3 denier, were employed. The invention is not limited in this regard, and, in fact, it is likely that variation of fibre characteristics will result in variations in the characteristics of the filter material. "Coarse" denier fibres are roughly speaking, of 5 denier and above, whilst fine denier fibres are, roughly speaking, below 1.5 denier. Fibres of different coarseness can be blended. It should be noted that there are other factors than efficiency to consider, such as the pressure drop across the filter material, and the cost and/or weight of filter material required to obtain a desired performance characteristic. Variation of fibre coarseness is one way in which such factors might be optimised.

What is claimed is:

1. An electrostatically charged filter material comprising a blend of polyester fibres and electrostatically chargeable fibres of at least one other kind, in which the ratio by weight of the polyester fibres to the fibres of the other kind or kinds is in the range 60:40 to 40:60, the fibres of at least one other kind being polypropylene fibres, the denier of the polypropylene fibres exceeding the denier of the polyester fibres by a factor of at least 1.5, and the deniers of the fibres in the blend being in the range 1.0 to 3 denier.

2. A method for producing an electrostatically charged filter material comprising the step of blending together polyester fibres with and electrostatically chargeable fibres of at least one other kind to provide a filter material in which the ratio by weight of the polyester fibres to the fibres of the other kind or kinds is in the range 60:40 to 40:60, the fibres of at least one other kind being polypropylene fibres, the denier of the polypropylene fibres exceeding the denier of the polyester fibres by a factor of at least 1.5, and the deniers of the fibres in the blend being in the range 1.0 to 3 denier.

* * * * *